United States Patent [19]

Ungs et al.

[11] Patent Number: 5,275,572
[45] Date of Patent: Jan. 4, 1994

[54] TRAINING ELECTRODE FOIL USED IN DEFIBRILLATOR/MONITOR INSTRUCTION AND METHOD OF INSTRUCTION

[75] Inventors: Mark T. Ungs; Lawrence R. Ford; John R. Loder, all of Redmond, Wash.

[73] Assignee: Physio-Control Corporation, Redmond, Wash.

[21] Appl. No.: 735,697

[22] Filed: Jul. 25, 1991

Related U.S. Application Data

[63] Continuation of Ser. No. 462,615, Jan. 9, 1990, abandoned.

[51] Int. Cl.⁵ .............................................. G09B 19/00
[52] U.S. Cl. ...................................... 434/265; 434/262
[58] Field of Search .................. 128/419; 434/265, 262

[56] References Cited

U.S. PATENT DOCUMENTS

| | | | |
|---|---|---|---|
| 3,895,635 | 7/1975 | Justus et al. | 128/303.13 |
| 4,209,020 | 6/1980 | Nielsen | 128/640 |
| 4,365,634 | 12/1982 | Bare et al. | 128/640 |
| 4,494,552 | 1/1985 | Heath | 128/696 |
| 4,660,562 | 4/1987 | House, Sr. | 128/640 |
| 4,738,263 | 4/1988 | Seebach et al. | 128/640 |

FOREIGN PATENT DOCUMENTS

| | | | |
|---|---|---|---|
| 2842681A1 | 3/1980 | Fed. Rep. of Germany | A61B 5/05 |
| 2287202 | 6/1975 | France | A61B 5/04 |
| 2571244 | 4/1985 | France | A61B 5/04 |

*Primary Examiner*—Paul J. Hirsch
*Assistant Examiner*—L. Thomas
*Attorney, Agent, or Firm*—Christensen, O'Connor, Johnson & Kindess

[57] ABSTRACT

A training electrode for use in training emergency personnel in electrocardiogram (EKG) defibrillation and monitoring is disclosed. An adhesive pad is fixedly attached to a connector comprising a connecting post and a connecting arm. Attached to the connecting arm is an electrical cable with a female-type adaptor at its distal end for connection to an electrocardiogram simulation signal generator. The connecting post inserts into a female-type adaptor from a defibrillator/monitor cable lead originating from a defibrillator/monitor. A detachable backing covers an adhesive surface of the adhesive pad such that the training electrode may be reused. Further, a training method is disclosed using the training electrode of the present disclosure and incorporating existing CPR mannequins and EKG simulation signal generators.

14 Claims, 4 Drawing Sheets

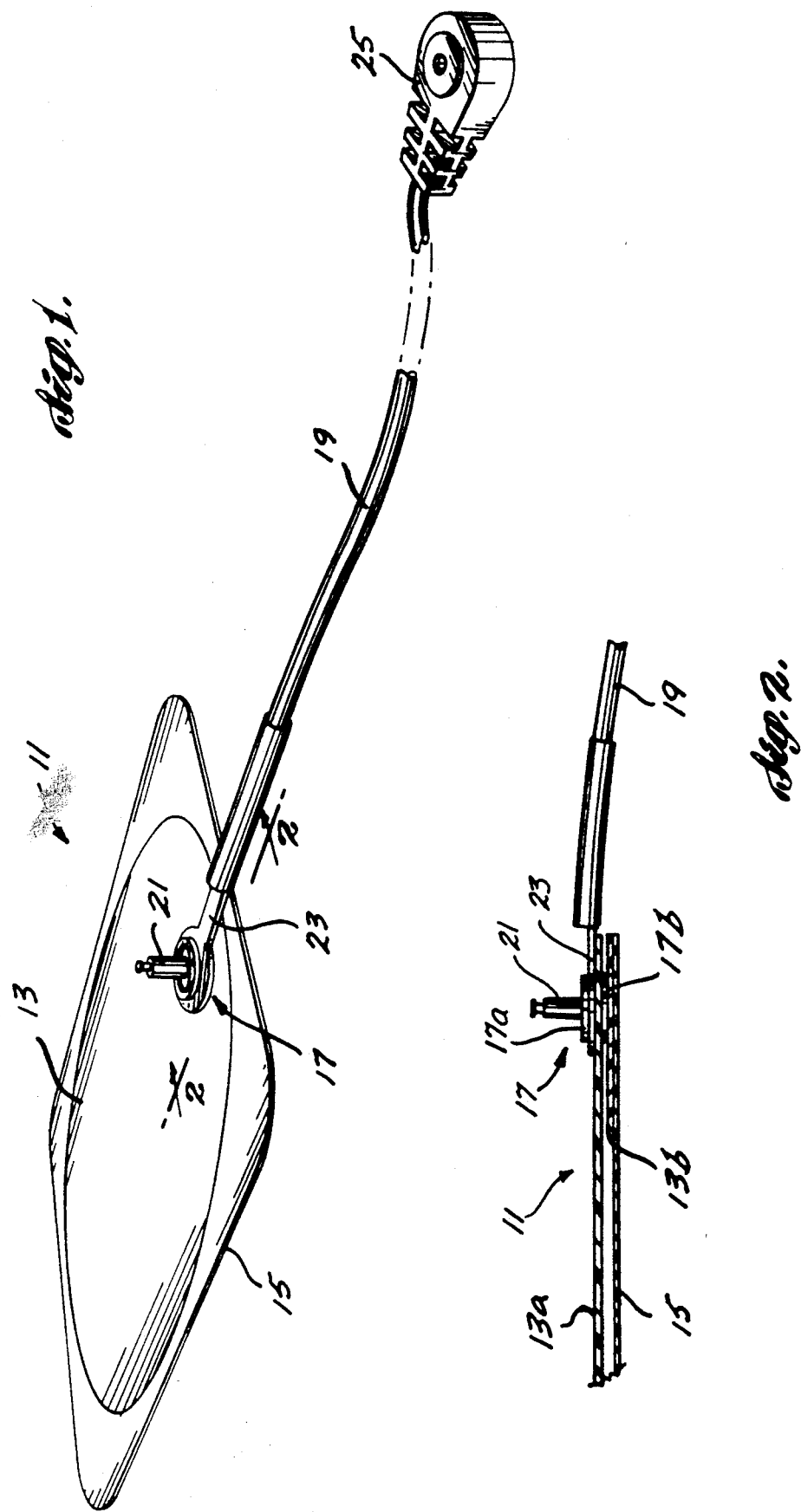

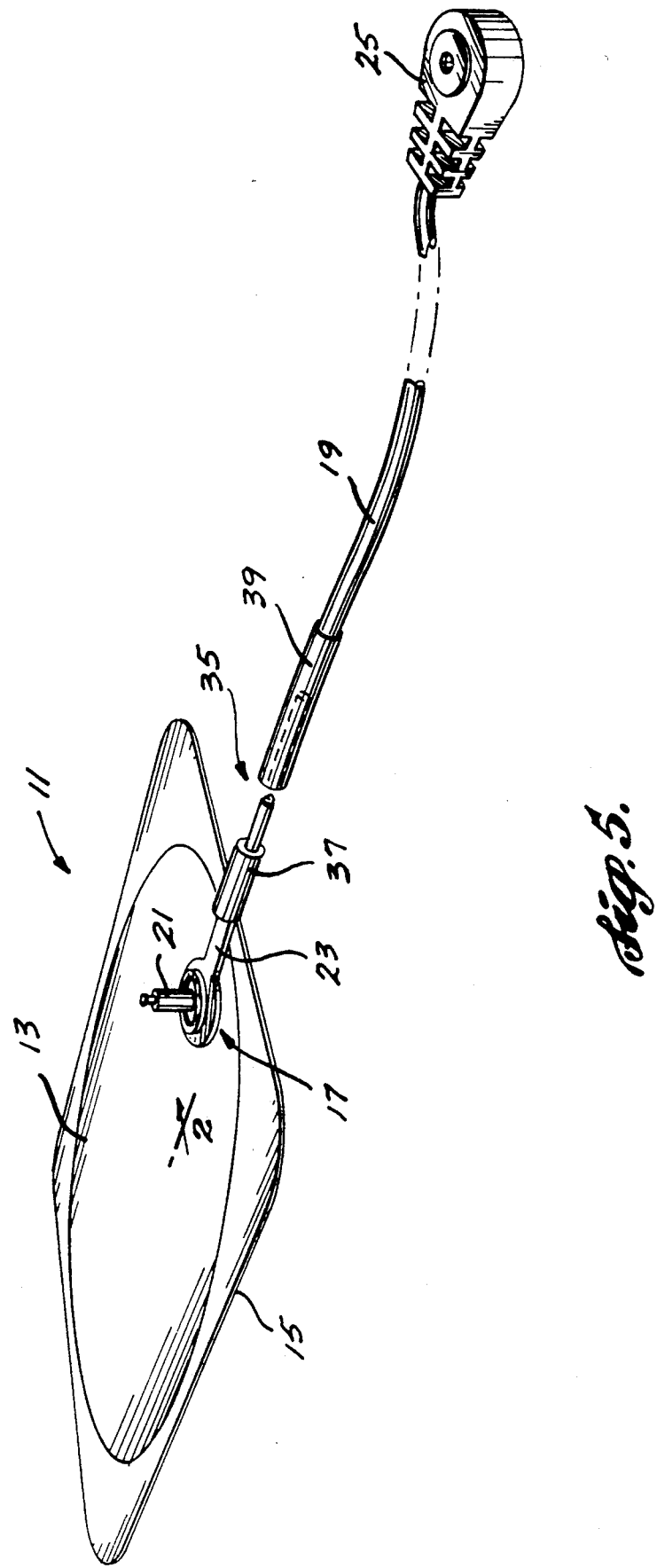

TRAINING ELECTRODE FOIL USED IN DEFIBRILLATOR/MONITOR INSTRUCTION AND METHOD OF INSTRUCTION

This application is a continuation application based on prior copending application Ser. No. 07/462,615, filed on Jan. 9, 1990, now abandoned.

TECHNICAL AREA

The present invention relates, in general, to the training of users of defibrillator/monitors, and more particularly, to a training electrode for accurately simulating actual electrode use with defibrillator/monitors.

BACKGROUND OF THE INVENTION

Cardiogenic anomalies and other life-threatening situations that require defibrillation or monitoring of electrocardiogram (EKG) activity place a great deal of stress on the emergency personnel attending. An example of such a situation is where a patient is undergoing cardiac arrest. In such a case, the responding emergency personnel are expected to connect defibrillator electrodes to a defibrillator/monitor (such as the LIFE-PAK ® defibrillator/monitors available from Physio-Control Corporation, Redmond, Wash.), apply the electrodes to the patient's chest area, and use the defibrillator/monitor to determine a further course of action. A typical sequence of steps in this process includes attaching defibrillator/monitor cable leads to electrode pads, applying the electrode pads to the patient's chest, and using the defibrillator/monitor display to interpret the EKG signals. The defibrillator/monitor cable leads are usually attached to the electrode pads before the pads are applied to the patient's chest to avoid the patient discomfort that might otherwise occur if the cable leads were pressed onto pads already attached to the patient.

Although the procedure of attaching electrode pads to the patient's chest and connecting the defibrillator/monitor cable leads to the electrode pads may seem simple and straightforward, in actual emergency situations errors may occur. Thus, it is advantageous to thoroughly and completely train attending emergency personnel in all aspects of this procedure. One method of training recognized to be effective is the repetitive simulation of emergency situations.

Training procedures of the past utilize an EKG simulation signal generator. Typically, these signal generators produce a simulated EKG signal at two electrical stud posts provided on the generator. The trainee attaches the defibrillator/monitor cable leads to the stud posts and, using the signal from the EKG simulation signal generator, evaluates and determines a next course of action, e.g., defibrillation. Although this training procedure provides practice in interpreting EKG signals, there is no attempt to simulate the appearance of a patient, or the process of attaching electrode pads to the patient. This training procedure places primary emphasis on the correct interpretation of the signal generated by the EKG simulation signal generator and not on the actual manual manipulation of the electrode pads and defibrillator/monitor cable leads. In fact, no electrode pads are used in this type of training procedure.

Another approach to training involves simulating the appearance of a patient by placing the EKG simulation signal generator inside of a mannequin. The electrical stud posts of the EKG simulation signal generator protrude from the chest area of the mannequin at substantially the same positions that electrodes would be applied in actual patient use. The trainee attaches an electrode-shaped adhesive pad to the chest area of the mannequin by aligning the electrical stud posts with a hole in the adhesive pad. Although this advance improved the cosmetic appearance of the simulation and introduced the step of applying adhesive pads, there yet was lacking the simulation and training of the sequence of applying electrode pads to the leads and then to the patient in the correct torsal locations. In the above-described prior art, the placement of the electrode pad is prompted by the location of the electrical stud posts and thus, there is no doubt as to the placement of the electrode pads. It will be appreciated that the correct placement of the electrode pads onto a patient is critical, since the electrode pad location greatly influences the effectiveness of monitoring and treatment. The present invention is directed toward also providing training in the correct placement of the electrode pads.

Furthermore, manufacturing specialized mannequins with EKG simulation signal generators incorporated within is cost prohibitive. Instead, it would be advantageous to utilize existing equipment to train the emergency personnel. For example, mannequins for use in Cardio-Pulmonary Resuscitation (CPR) training are readily available and relatively common. Further, the use of existing independent EKG simulation signal generators would be advantageous.

The present invention is directed to avoiding the foregoing and other disadvantages by providing a realistic training electrode that is reusable, inexpensive, utilizes existing equipment, and aids in accurately simulating the process of EKG monitoring, evaluation, and defibrillation.

SUMMARY OF THE INVENTION

In accordance with this invention, a training electrode for use with existing CPR-training mannequins and EKG simulation signal generators to train emergency personnel in the use of defibrillator/monitors is disclosed. The training electrode includes an adhesive pad having a reusable backing, a connector attached to the adhesive pad, and an electrical cable. The connector has a first and a second connecting point, the first connecting point being attached to the proximal end of the electrical cable. The distal end of the electrical cable has an adaptor for use in electrical attachment to an EKG simulation signal generator. The second connection point receives an electrical defibrillator cable lead from the defibrillator/monitor.

As will be appreciated from the foregoing brief summary, the invention provides a training electrode that realistically and accurately portrays the steps of EKG monitoring and defibrillation.

BRIEF DESCRIPTION OF THE DRAWINGS

The foregoing advantages of this invention will become more readily appreciated as the same becomes better understood by reference to the following detailed description, when taken in conjunction with the accompanying drawings wherein:

FIG. 1 is a pictorial view of a training electrode formed in accordance with the present invention;

FIG. 2 is a partial cross section taken along lines 2—2 of FIG. 1;

DETAILED DESCRIPTION OF THE PREFERRED EMBODIMENT

Figure 3:
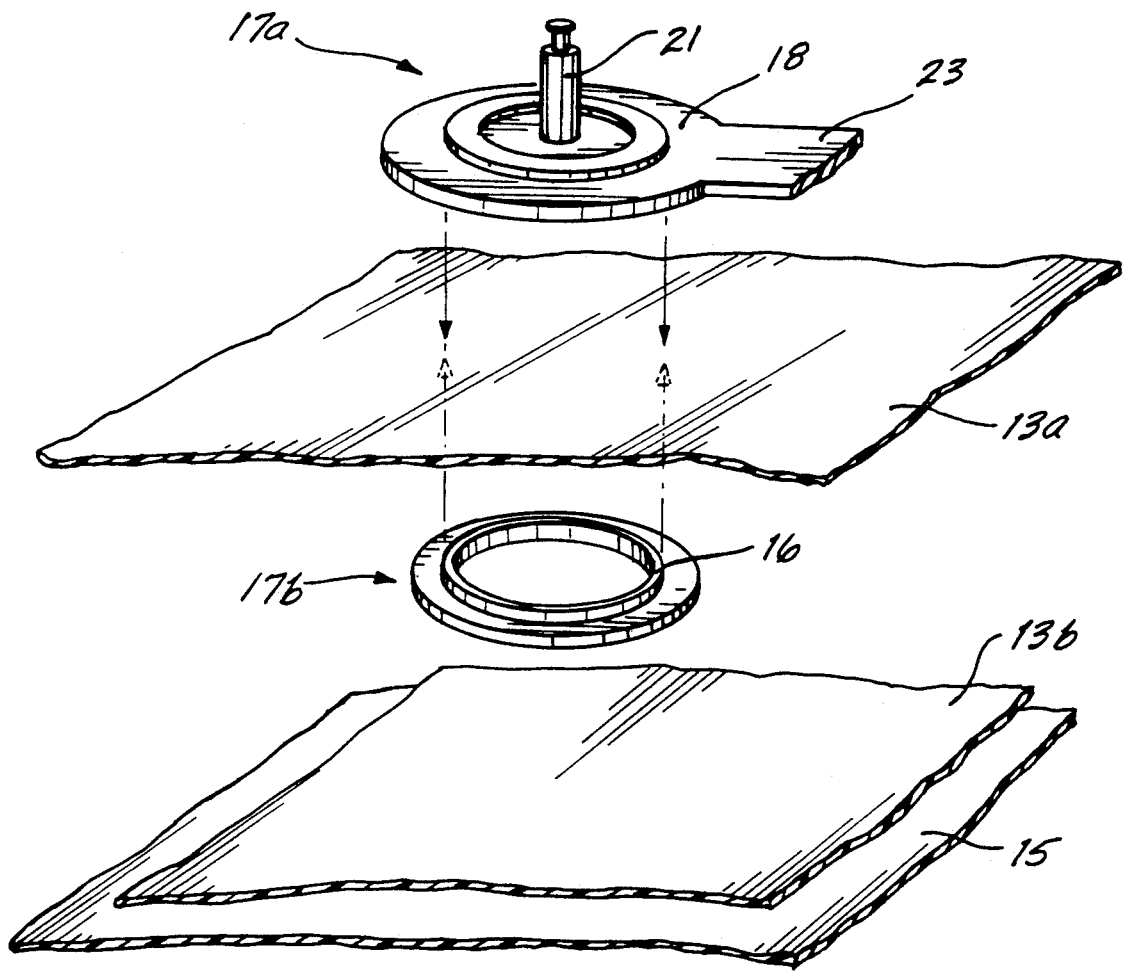
FIG. 3 is an exploded pictorial view of a connector included in the training electrode of FIG. 1.

FIGS. 1 and 2 illustrate a training electrode 11 formed in accordance with this invention. The illustrated training electrode 11 comprises a flat adhesive pad 13, a protective backing 15, a connector 17, and an electrical cable 19.

The adhesive pad 13 is further comprised of two separate substantially oval flat pieces, a contact piece 13b, and a top piece 13a. The two pieces 13a and 13b are substantially identical except that the top piece 13a has a nonadhesive side and an adhesive side, whereas the contact piece 13b has both sides coated with an adhesive. The connector 17 is crimped to the top piece 13a, as described in greater detail below, and projects from the nonadhesive side of the top piece 13a, adjacent one end of the top piece 13a.

Referring to FIGS. 2 and 3, the connector 17 is comprised of a conductive main body 17a and a circular washer 17b. Addressing these components individually, the main body 17a includes a connecting post 21, circular base 18, and connecting arm 23. The connecting arm 23 serves as an electrical interface with cable 19 and projects radially outwardly from the circular base 18. The connecting post 21 provides an interface to the defibrillator/monitor cables and extends perpendicularly from the circular base 18. The connecting post 21 is formed such that defibrillator/monitor cable leads are easily removed and attached.

Addressing the washer 17b, it has a circular ridge 16 that engages a similarly formed recess in a circular base 18 portion of the main body 17a. This arrangement allows the connector 17 to be attached to the top piece 13a in the following manner. Prior to assembly, the top piece 13a of the adhesive pad 13 is disposed between body 17a and washer 17b of connector 17 such that the circular washer 17b is directly aligned beneath the circular base 18 of main piece 17a. By crimping the body 17a and the washer 17b of connector 17 together, the circular ridge 16 engages the recess in the circular base 18 and the top piece 13a of the adhesive pad 13 is held securely between the two pieces of the connector 17. It will be appreciated that the attachment of the connector 17 to the top piece 13a of the adhesive pad 13 may be accomplished in many ways, and the above description is merely illustrative and not restrictive.

After the attachment of the connector 17 is accomplished, the contact piece 13b of the adhesive pad 13 is disposed adjacent and adhered to the top piece 13a, with both pieces aligned such that the outer boundaries of each piece are substantially common. The arrangement results in the washer 17b of connector 17 being sandwiched between the contact piece 13b and the top piece 13a of pad 13.

Adhered to the adhesive side of the contact piece 13b is a protective backing 15. The protective backing 15 is larger than the adhesive pad 13, but of generally similar shape and is easily removable from the adhesive pad 13 to expose the adhesive coating. Further, because the adhesive pad 13 retains its adhesive properties after use, the protective backing 15 can be reattached onto the adhesive pad 13 and then later removed so that the training electrode 11 may be reused.

Attached to the connecting arm 23 of connector 17 is the proximal end of electrical cable 19. On the distal end of the electrical cable 19 is an adaptor 25 for use in electrical attachment to an EKG simulation signal generator 29. In one embodiment, the adaptor 25 is a female-type adaptor for receiving the male-type connector of the EKG simulation signal generator 29.

Figure 4:
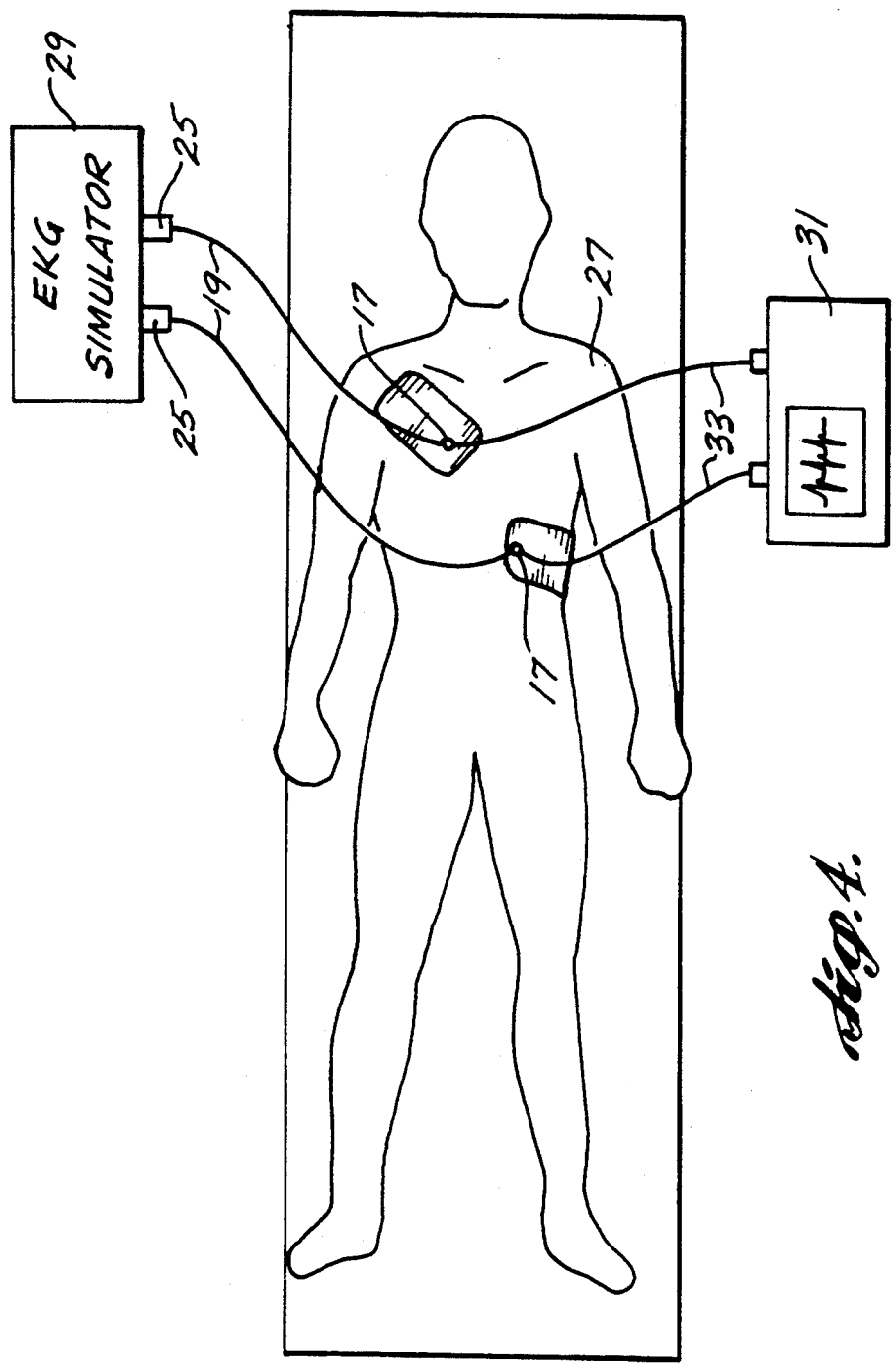
FIG. 4 is a pictorial view of a training electrode in use in a training environment; and, FIG. 5 is a pictorial view of an alternative embodiment of the training electrode of FIG. 1.

The use of the training electrode can be better understood with reference to FIG. 4. The training electrode 11 is generally used in pairs to correspond with actual defibrillation/monitoring use. Prior to the simulation, the female adaptors 25 of both training electrodes 11 are attached to the output of an EKG simulation signal generator 29 and the generator is switched on to continuously send EKG signals. The trainee begins the training session by attaching the defibrillator/monitor cable leads 33 from the defibrillator/monitor 31 to the appropriate connecting posts 21 on each adhesive pad 13. Next, the protective backings 15 are removed from the adhesive pads 13. The adhesive pads are then placed onto the mannequin 27 at designated chest locations.

It can be appreciated that, at this time, simulated EKG signals are transmitted from the EKG simulation signal generator 29 via the cable adaptors 25, the electrical cables 19, and finally the connectors 17. The signals generated by the EKG simulation signal generator 29 are then transmitted via the connecting posts 21 and the defibrillator/monitor cable leads 33 to produce a display on the screen of the defibrillator/monitor 31. The trainee may then interpret the EKG signal to determine whether defibrillation is necessary. If defibrillation is required, the trainee initiates a discharge from the defibrillator/monitor. The discharge travels through the training electrodes to the EKG simulation signal generator and is dissipated therein.

As will be appreciated, after a number of uses, the adhesive pad 13 will no longer properly adhere to the CPR mannequin. In the embodiment of training electrode 11 shown in FIG. 1, the electrical cable 19 is permanently attached to the adhesive pad 13 by connector 17. Thus, when the adhesive pad 13 is to be replaced, the electrical cable 19 must also be replaced. The electrical cable 19 is, however, the most expensive component of the training electrode 11. To allow cable 19 to be reused, another embodiment of training electrode 11 has been developed.

Referring to FIG. 5, a training electrode 11 is shown that is identical to the electrode illustrated in FIG. 1, with the exception that a banana-type connector 35 is used to couple electrical cable 19 to connector 17. More particularly, a male end 37 of connector 35 is attached to the arm 23 of connector 17. The male end 37, in turn, engages a female end 39 of connector 35 attached to cable 19. Thus, when an adhesive pad 13 is to be discarded, the male and female ends of banana-type connector 35 are simply disengaged and the female end 39 of cable 19 attached to the male end 37 provided with a new adhesive pad 13.

Use of the training electrodes formed in accordance with the present invention incorporates the steps of connecting the defibrillator/monitor cable leads from the defibrillator/monitor to the electrodes, removing the protective backing on the electrodes, placing the training electrodes onto a standard CPR mannequin in a desired position, monitoring the signals generated by the signal generator 29, and discharging the defibrillator/monitor. This training sequence more realistically simulates all of the steps required in actual operation of a defibrillator/monitor, while utilizing readily available equipment.

While the preferred embodiment of the invention has been illustrated and described, it will be appreciated that various changes can be made therein without departing from the spirit and scope of the invention. For example, while the preferred apparatus of the invention utilizes a female-type connector to connect to the EKG simulation signal generator, a male-type connector may be appropriate. Thus, within the scope of the appended claims, it is to be understood that the invention can be practiced otherwise than as specifically described herein.

The embodiments of the invention in which an exclusive property or privilege is claimed are defined as follows:

1. A training electrode for use with conventional CPR mannequins and allowing simultaneous parallel connection to an external defibrillator/monitor and an external signal generator comprising:
   (a) an adhesive pad for application to a CPR mannequin;
   (b) a connector having first and second electrical connection points and a physical connection point that is distinct from said first and second electrical connection points, said connector being attached to said adhesive pad at said physical connection point, said second electrical connection point adapted for connection to the defibrillator/monitor; and
   (c) an electrical cable having a first end attached to said first electrical connection point of said connector and having a second end adapted for attachment to the signal generator, the signal generator and the defibrillator/monitor being connected in parallel.

2. The training electrode of claim 1, wherein said adhesive pad further comprises an adhesive surface and a removable backing that covers said adhesive surface of said adhesive pad, said removable backing being detachable and reattachable from said adhesive pad.

3. The training electrode of claim 1, wherein said training electrode is further for use in conjunction with a defibrillator/monitor, said second electrical connection point being adapted for receiving defibrillator/monitor cable leads.

4. The training electrode of claim 1, wherein said second end of said electrical cable is a female-type connector.

5. The training electrode of claim 1, wherein said second electrical connection point of said connector is a male-type electrical stud.

6. A training electrode for use with conventional CPR mannequins allowing simultaneous parallel connection to an external defibrillator/monitor and an external signal generator comprising:
   (a) a pad for application to a CPR mannequin;
   (b) a connector attached to said pad, said connector having a first electrical connection point and having a second electrical connection point, said second electrical connection point being for connection to the defibrillator/monitor; and
   (c) an electrical cable having a first end attached to said first electrical connection point and having a second end adapted for attachment to said signal generator, said pad, connector, and electrical cable being for cooperatively connecting the CPR mannequin, external signal generator, and the defibrillator/monitor in parallel.

7. The training electrode of claim 6, wherein said pad further comprises an adhesive surface and a removable backing that covers said adhesive surface of said pad, said removable backing being detachable from and reattachable to said pad.

8. The training electrode of claim 6, wherein said second end of said electrical cable is a female-type connector.

9. The training electrode of claim 6, wherein said second electrical connection point of said connecting post is a male-type electrical stud.

10. An electrode, for use with conventional CPR mannequins and allowing simultaneous parallel connection to an external defibrillator/monitor and an external signal generator, comprising:
    (a) a pad for application to a CPR mannequin; and
    (b) a connector, attached to said pad, having a first connection point adapted for providing a detachable connection between said connector and the external defibrillator/monitor and a second connection point adapted for providing a detachable connection between said connector and the external signal generator.

11. An electrode, for use with a conventional CPR mannequin and for allowing simultaneous parallel connection of the mannequin to an external defibrillator/monitor and an external signal generator, comprising:
    (a) a pad for application to the CPR mannequin;
    (b) a connector attached to said pad, said connector including a conductive post for providing an electrical connection to the defibrillator/monitor; and
    (c) a cable, attached to said connector adjacent said conductive post, for providing an electrical connection to the external signal generator.

12. A training electrode, for use with conventional CPR mannequins allowing simultaneous parallel connection to an external defibrillator and an external signal generator, said electrode comprising:
    (a) a pad for application to a CPR mannequin; and
    (b) connection means, attached to said pad, for connecting said pad to the external defibrillator and the external signal generator.

13. The training electrode of claim 12, wherein said connection means comprises:
    (a) first detachable connector means for detachably connecting said pad to the external defibrillator; and
    (b) second detachable connector means for detachably connecting said pad to the external signal generator.

14. The training electrode of claim 12, wherein said connection means comprises:
    (a) detachable connector means for detachably connecting said pad to the external defibrillator; and
    (b) cable means for coupling said pad to the external signal generator.

* * * * *

UNITED STATES PATENT AND TRADEMARK OFFICE
CERTIFICATE OF CORRECTION

PATENT NO. : 5,275,572
DATED : January 4, 1994
INVENTOR(S) : M. T. Ungs et al.

It is certified that error appears in the above-indentified patent and that said Letters Patent is hereby corrected as shown below:

| COLUMN | LINE | |
|---|---|---|
| [54] "Title" | 1 | "TRAINING ELECTRODE FOIL USED IN DEFIBRILLATOR/MONITOR INSTRUCTION AND METHOD OF INSTRUCTION" should read --TRAINING ELECTRODE FOR USE IN DEFIBRILLATOR/MONITOR INSTRUCTION AND METHOD OF INSTRUCTION-- |
| [56] | "Attorney" | "Christensen, O'Connor, Johnson & Kindess" should read --Christensen, O'Connor, Johnson & Kindness-- |
| 1 | 23 | "defibrillator" should read --defibrillation-- |

Signed and Sealed this

Seventh Day of June, 1994

Attest:

BRUCE LEHMAN

*Attesting Officer*  *Commissioner of Patents and Trademarks*